(12) United States Patent
Rosset et al.

(10) Patent No.: US 8,109,206 B2
(45) Date of Patent: Feb. 7, 2012

(54) LIMITED OVERFLOW WAFFLE IRON

(75) Inventors: Roger Rosset, Bloye (FR); Guillaume Prieto, Seynod (FR); Jérôme Tranchant, Rumilly (FR)

(73) Assignee: Seb SA, Ecully (FR)

( * ) Notice: Subject to any disclaimer, the term of this patent is extended or adjusted under 35 U.S.C. 154(b) by 667 days.

(21) Appl. No.: 11/667,427

(22) PCT Filed: Nov. 8, 2005

(86) PCT No.: PCT/FR2005/002787
§ 371 (c)(1),
(2), (4) Date: Dec. 27, 2007

(87) PCT Pub. No.: WO2006/051215
PCT Pub. Date: May 18, 2006

(65) Prior Publication Data
US 2008/0245241 A1  Oct. 9, 2008

(30) Foreign Application Priority Data
Nov. 10, 2004  (FR) .................................. 04 12002

(51) Int. Cl.
*A47J 37/06* (2006.01)
*A47J 37/00* (2006.01)
(52) U.S. Cl. ................. 99/375; 99/372; 99/379; 99/380
(58) Field of Classification Search .................. 99/379, 99/415, 372–375, 380; 219/401, 524, 525, 219/415; 126/369, 20
See application file for complete search history.

(56) References Cited

U.S. PATENT DOCUMENTS

| | | | | |
|---|---|---|---|---|
| 2,899,888 A | * | 8/1959 | Koci | 99/331 |
| 3,719,507 A | * | 3/1973 | Bardeau | 99/375 |
| 5,363,748 A | * | 11/1994 | Boehm et al. | 99/372 |
| 5,937,742 A | | 8/1999 | Steeb et al. | |

FOREIGN PATENT DOCUMENTS

| | | |
|---|---|---|
| FR | 2521419 | 8/1983 |
| GB | 1323262 | 7/1973 |

* cited by examiner

*Primary Examiner* — Henry Yuen
*Assistant Examiner* — Jianying Atkisson
(74) *Attorney, Agent, or Firm* — Bachman & LaPointe, P.C.

(57) ABSTRACT

The inventive waffle iron has two baking sub-assemblies pivotable with respect to each other from an open position and a closed proximate position in which they define a baking chamber. At any position of the baking sub-assemblies between the closed proximate position and the closed offset position thereof, wherein they are offset from each other by a product expansion, a peripheral element of a baking sub-assembly slides along a corresponding peripheral element of the other baking sub-assembly in such a way that the variable volume baking chamber is formed.

18 Claims, 2 Drawing Sheets

LIMITED OVERFLOW WAFFLE IRON

BACKGROUND (1) Field of the Invention

The invention relates to a waffle iron or to any other similar electric baking appliance comprising two baking sub-assemblies pivotable with respect to one another.

(2) Prior Art

A household appliance is known of the type comprising two baking sub-assemblies which are pivotable with respect to one another between an open position and a closed proximate position in which they define a baking chamber.

It eventuates that, when the food to be baked is of the type tending to swell under the action of the heat given off by the baking sub-assemblies, as is the case of waffle dough which can grow in size considerably (with a coefficient of 2 to 3 according to the ingredients utilised), the food tends to overflow from the baking sub-assemblies, which then dirties the household appliance and the work plane on which the latter rests, and produces waffles having unsightly edges. Also, the user tends to reduce the quantity of dough to avoid any overflow, which produces waffles with a face almost without relief.

The problem here is to produce an electrical appliance of the abovementioned type which is simple and can make dough-based foods (of waffle type) without the dough overflowing from the appliance.

SUMMARY OF THE INVENTION

According to the invention, in the household appliance of the above type, irrespective of the position of the two heating sub-assemblies between their closed proximate position and a closed spread position, a peripheral element of a baking sub-assembly slides along a corresponding peripheral element of the other baking sub-assembly so as to form a baking chamber with variable volume.

Consequently, due to the fact that the upper baking sub-assembly can move away from the lower baking sub-assembly so as to increase the volume of the baking chamber, under the action of the dough, the latter remains in the baking chamber and is integrated into the thickness of the waffle.

BRIEF DESCRIPTION OF THE DRAWINGS

Other particular features and advantages will emerge from the description of the embodiments given by way of non-limiting example and illustrated by the attached drawings.

DETAILED DESCRIPTION OF THE PREFERRED EMBODIMENT(S)

Figure 1:
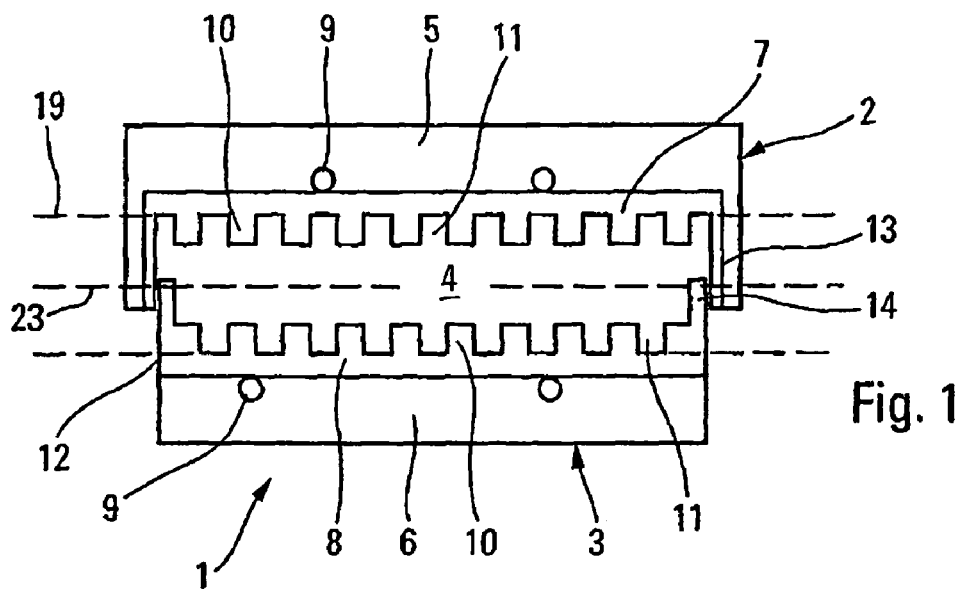
FIG. 1 is a schematic sectional view of a waffle iron according to a first embodiment of the present invention.

A household appliance 1 (in this case a waffle iron) conventionally comprises an upper baking sub-assembly 2 and a lower baking sub-assembly 3 which are pivotable to one another by a hinge between an open position allowing the deposit of the food to be baked (in this case the dough) and the removal of the baked food (in this case a waffle), and a closed proximate position in which the two baking sub-assemblies 2, 3 are opposite (the waffle iron 1 not holding dough to be baked) and define a baking chamber 4.

Furthermore, each baking sub-assembly 2, 3 comprises a shell 5, 6 forming the body of the sub-assembly 2, 3, a baking plate 7, 8 adapted to receive and to bake the dough, and electrical heating resistance 9 which imparts to the baking plate 7, 8 the thermal energy necessary for baking. Conventionally for a waffle iron, each baking plate 7, 8 comprises teeth 10 oriented in the direction of the other baking plate 8, 7 when the two sub-assemblies are in their closed proximate position, and throats 11 which delimit these teeth 10.

According to the invention, each baking sub-assembly 2, 3 comprises at least one peripheral element 13, 15, 21, 17, 20, 12, 14, 16, 18. Irrespective of the position of the two baking sub-assemblies 2, 3 between their closed proximate position and a closed spread position (position in which the two baking plates are opposite and are spread apart from one another under the action of the expansion of the dough), each peripheral element 13, 15, 21, 17, 20 of a baking sub-assembly slides along a peripheral element 12, 14, 16, 18 corresponding to the other baking sub-assembly so as to delimit a baking chamber with variable volume. The upper baking sub-assembly 2 acts, between the proximate closed and spread closed positions, like the rod of a jack, and is guided by the cooperation between the peripheral elements 13, 15, 21, 17, 20, 12, 14, 16, 18 of the two baking sub-assemblies 2, 3. To this end, the hinge of the waffle iron 1 allows considerable vertical movement of the two baking sub-assemblies 2, 3 between the two closed positions.

To prevent evacuation of the dough from the baking chamber 4 irrespective of the position of the two baking sub-assemblies 2, 3 between their proximate closed and spread closed positions, each peripheral element 13, 15, 21, 17, 20 of a baking sub-assembly preferably extends sufficiently in the direction of the peripheral element 12, 14, 16, 18, 13 corresponding to the other baking sub-assembly to be covered when the two baking sub-assemblies 2, 3 are in this closed spread position.

The spread between two corresponding peripheral elements 12, 14, 13, 15, 21, 16, 17, 20, 18 can be zero, with one of them able to comprise a seal. However, as a function of the type of dough (dough for donut, for waffle . . . ) as well as of the coating placed on the baking plates, the spread can be more or less substantial. To prevent the dough from passing between the peripheral elements 12, 14, 13, 15, 21, 16, 17, 20,

18, it is preferably at most 2 mm or 3 mm, or even 5 mm, when the two baking sub-assemblies 2, 3 are in their closed proximate position.

It should be noted that the elevation of the upper baking sub-assembly 2 is done from a certain baking time, and that due to this, when the two baking sub-assemblies 2, 3 are in their closed spread position, the dough no longer has the same fluidity as when they are in their closed proximate position. Consequently, the maximum spread between two corresponding peripheral elements 12, 14, 13, 15, 21, 16, 17, 20, 18, when the two baking sub-assemblies are in their closed spread position, can, with different characteristics (less restrictive), prevent the dough from escaping from the baking chamber 4.

Figure 2:
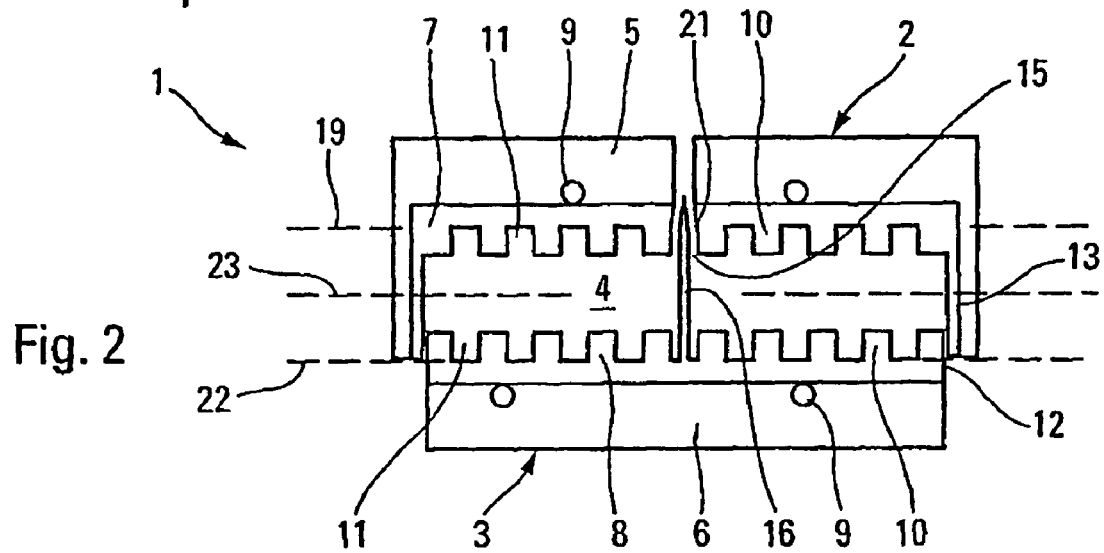
FIG. 2 is a schematic sectional view of a waffle iron according to a second embodiment of the present invention.

In the embodiments illustrated in FIGS. 1 to 2, the peripheral element 12 of the lower baking sub-assembly 3 is formed by the outer periphery 12 of this sub-assembly, that of the upper baking sub-assembly 2 is formed by an outer peripheral wall 13 which extends in the direction of the outer periphery 12 of the lower baking sub-assembly 3.

In the embodiment illustrated in FIG. 1, the outer periphery 12 of the lower baking sub-assembly 3 is completed by an outer peripheral wall 14 which extends from this outer periphery 12, in the direction of the upper baking sub-assembly 2.

In the embodiment illustrated in FIG. 2, the baking sub-assemblies 2, 3 comprise a second peripheral element 15, 16: for the upper baking sub-assembly 2, this second baking element 15 is formed by an opening 15 made in the upper baking plate 7, and, for the lower baking sub-assembly 3, it is formed by an inner peripheral wall 16 which extends in the direction of the opening 15. The inner peripheral walls 16 supported by the lower baking plate 8 can serve as separation grooves for waffles in the case of a baking plate 8 so as to act as mould for several waffles. The appliances for donuts in the shape of a torus can likewise be constructed along the same principle. In addition, the peripheral element of the upper baking sub-assembly 2 is completed by an inner peripheral wall 21 which extends from the opening 15, in the direction opposite the lower baking sub-assembly 3.

Figure 3:
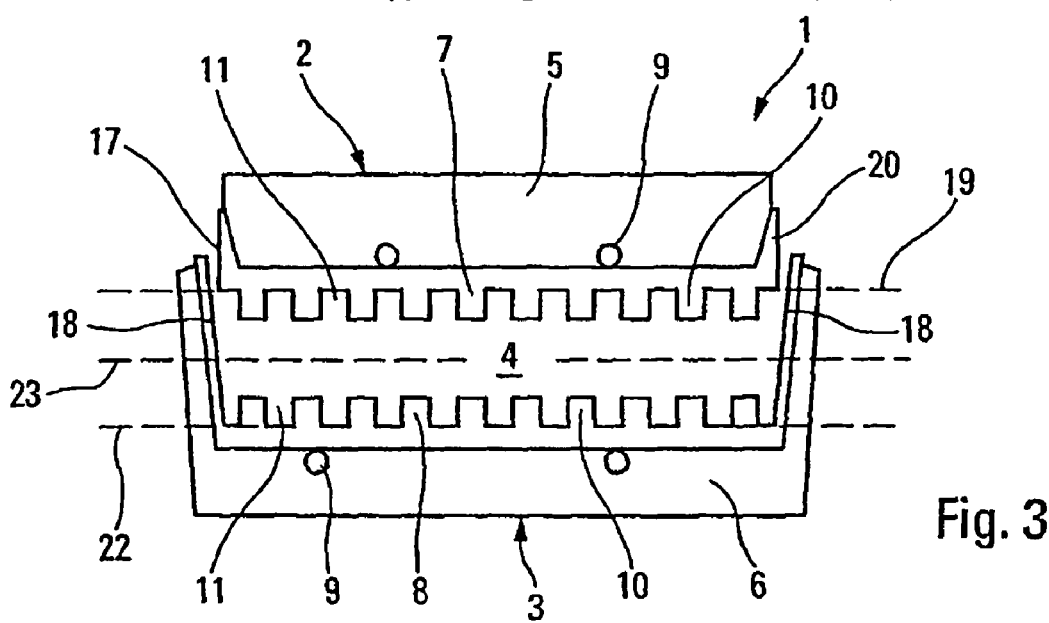
FIG. 3 is a schematic sectional view of a waffle iron according to a third embodiment of the present invention.

In the embodiment illustrated in FIG. 3, the peripheral element 17 of the upper baking sub-assembly 2 is formed by the outer periphery 17 of this sub-assembly, the lower baking sub-assembly 3 bearing an outer peripheral wall 18 which forms the corresponding peripheral element and which extends in the direction of the outer periphery 17 of the upper baking sub-assembly 2, as far as the base plane 19 of the upper baking plate 3 (plane defined by the base of the throats 11 of this plate).

In addition, in this embodiment, the peripheral element of the upper baking sub-assembly 2 is completed by an outer peripheral wall 20 which extends from this outer periphery 17, in the direction opposite the lower baking sub-assembly 3. The outer peripheral walls 20, 18 of the two baking sub-assemblies 2, 3 slide along one another.

In the embodiments illustrated in FIGS. 1 to 3, the peripheral wall (outer 13, 20, 14, 18 and/or inner 21, 16) of each baking plate 2, 3 describes an angle between 90° and 135° with the base plane 19, 22 of the corresponding baking plate 7, 8, and preferably between 92° and 100°, such that the spread between this peripheral wall 13, 14, 16, 18, 20, 21 and the corresponding peripheral element 12, 14, 13, 15, 21, 17, 20, 18, 16 remains virtually constant irrespective of the position of the two baking sub-assemblies 2, 3 between their proximate closed and spread closed positions. An angle of less than 92° risks causing wedging between the two corresponding peripheral elements 12, 14, 13, 15, 21, 16, 17, 20, 18 and thus disrupting upward displacement of upper baking sub-assembly 2, and forcing the dough in passing between the two peripheral elements 12, 14, 13, 15, 21, 16, 17, 20, 18. An angle greater than 100° substantially increases the spread between the two peripheral elements 12, 14, 13, 15, 21, 16, 17, 20, 18 when the upper baking sub-assembly 2 is moved upwards, which can favour the passage of the dough.

In the embodiments illustrated in FIGS. 1 to 3, each peripheral wall 13, 21, 17, 14, 16, 18 is monobloc with the corresponding baking plate 7, 8. In addition, the peripheral walls 13, 21, 17, 14, 16, 18 extend over the entire periphery of the baking sub-assemblies 2, 3.

Figure 4:
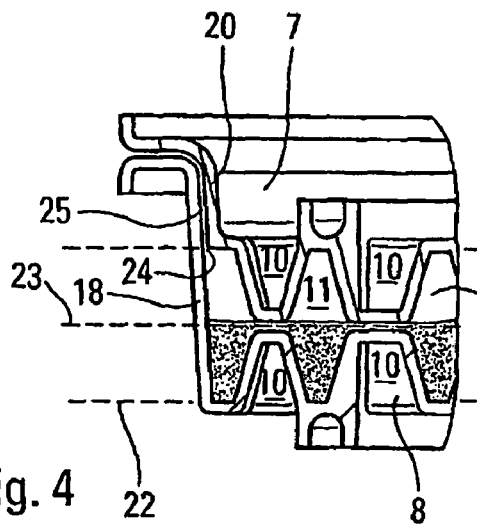
FIG. 4 is a partial sectional view of a waffle iron according to the third embodiment, waffle dough having been placed on the lower baking plate, the two baking sub-assemblies being in their closed proximate position.
Figure 5:
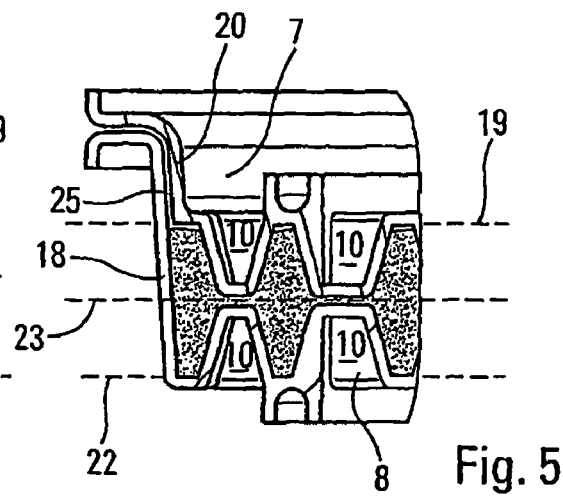
FIG. 5 is a view similar to FIG. 4, the dough having swollen to fill the entire upper baking plate, the two baking sub-assemblies being still in a closed proximate position.
Figure 6:
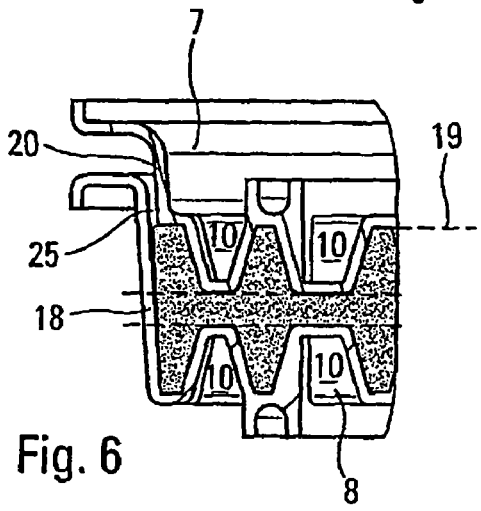
FIG. 6 is a view similar to FIGS. 5 and 6, the dough having continued its expansion to where it spreads apart the two baking sub-assemblies, without any overflow.
Figure 7:
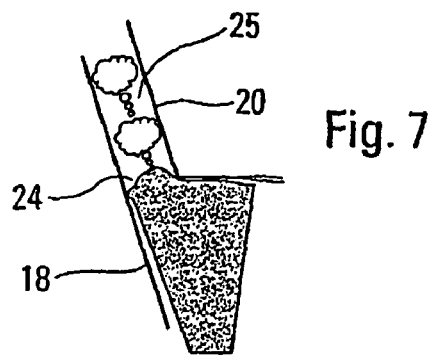
FIG. 7 is a sketch illustrating a particular aspect of the present invention.

FIGS. 4 to 6 illustrate the process of baking a waffle in a waffle iron 1 according to the present invention.

After the waffle dough has been deposited on the lower baking plate 8, the upper baking sub-assembly 2 is closed over the dough, the two baking sub-assemblies 2, 3 then being in their closed proximate position (cf. FIG. 4).

As soon as the two baking sub-assemblies 2, 3 are in their closed proximate position, the baking of the dough causes its expansion so as to reach the upper baking plate 7 (cf. FIG. 5), the peripheral elements 18, 20 of the baking sub-assemblies 3, 2 preventing the dough from escaping from the baking chamber 4.

As a result, due to its expansion the dough pushes the upper baking sub-assembly 2 upwards, until it reaches a closed spread position (cf. FIG. 6), the peripheral elements 20, 18 continuing to prevent evacuation of the dough from the baking chamber 4. As is evident from FIG. 6, the outer peripheral wall 18 of the lower baking sub-assembly 3 extends slightly beyond the base plane 19 of the upper baking plate 7 when the two baking sub-assemblies 2, 3 are in this closed spread position.

As is evident from FIG. 4, the outer peripheral wall 20 of the upper baking sub-assembly 3 extends to where it reaches the end of the corresponding peripheral wall 18 of the lower baking sub-assembly 3 when the two baking sub-assemblies 2, 3 are in the closed proximate position.

Consequently, according to the present invention, all surplus dough is integrated in the thickness of the waffle and is no longer ejected from the baking chamber 4. Since this surplus dough which can be integrated can be relatively substantial, the limit being the amplitude of positions of the upper baking sub-assembly 2 in the closed position. It is thus possible to make original waffle recipes, such as for example, stuffed waffles made by depositing a first layer of dough on the lower baking plate 8, a layer of filling on the first layer of dough, and a second layer of dough on the layer of filling.

The amplitude of movement of the upper baking sub-assembly 2 can be considerable: several millimetres (2 or 5 mm), anywhere up to 10 or 15 mm, or even 20 or even 30 mm, or more. The limit is mainly the interest in producing a waffle (or any other food of this type) reaching such thickness.

To avoid any excess of dough which might inevitably cause overflow (the amplitude of positions of the upper baking sub-assembly 2 being necessarily limited for a given waffle iron) or a lack of dough, the lower baking sub-assembly 3 preferably comprises an optimal level indicator of waffle dough. Such an indicator can be a step, a tooth having a specific height, or serigraph made for example on the peripheral external wall 18 of the lower baking sub-assembly 3.

In the embodiments where the outer peripheral wall 18 of the lower baking sub-assembly 3 extends well beyond the median plane 23 of the baking chamber 4 (defined as being the plane equidistant from the two baking plates 7, 8 of the household appliance 1 in the closed proximate position, and more precisely, in the case of a waffle iron, the plane equidistant from the two base planes 19, 22 of the baking plates 7, 8), or even beyond the base plane 19 of the upper baking sub-assembly 2, over the entire periphery of the lower baking sub-assembly 3, the extraction of the waffle can prove to be particularly delicate.

Several systems are possible for facilitating this extraction:

the lower baking plate 8 can be separable of the lower baking sub-assembly 3 and from the outer peripheral wall 18 (optionally from the peripheral inner wall 16), and comprise a prehensile organ facilitating its handling.

the lower baking sub-assembly 3 can comprise a lever mobile between a rest position in which it rests on the lower baking plate 8, and an activated position in which it projects upwards, bringing the waffle with it.

The two baking plates 7, 8 can have an anti-adhesive coating, the adhesive capacity of that deposited on the upper baking plate 7 being greater than that deposited on the lower baking plate 8, the waffle thus having a tendency to remain hooked onto the upper baking plate 7 from where it can easily be detached.

each baking plate 7, 8 can have teeth 10 having shapes particular to it, those 10 of the upper baking plate 7 being able to comply so as to favour gripping the waffle, while those 10 of the lower baking plate 8 can conform so as to favour its detachment.

It would also be possible for the outer peripheral wall 18 of the lower baking sub-assembly 3 to comprise, so as to define access to the side of the waffle, a main part which, on around 300° (or even more), extending beyond the median plane 23 of the waffle iron 1 (or even beyond the base plane 19 of the upper baking sub-assembly 2 when the two baking sub-assemblies 2, 3 are in their closed spread position), and a complementary part extending preferably only as far as the median plane 23, over around 60° (or even less), the complementary part of the outer peripheral wall 18 of the lower sub-assembly 3 being able to comprise a seal cooperating with the corresponding part of an outer peripheral wall of the upper baking sub-assembly oriented in the direction of the lower baking sub-assembly 3, so as not to create a passage by which the dough could escape.

According to a particular embodiment (illustrated in FIGS. 4 to 7) of the present invention, the spread between the peripheral elements 18, 20 of the two baking sub-assemblies 3, 2, when they are in their closed proximate position, forms an orifice 24 of an exhaust pipe 25 for the steam generated by the baking of the dough. For proper evacuation of the steam, it is preferable that this spread is at least 0.5 mm. When the two baking sub-assemblies 2, 3 are in their closed proximate position, they touch only at certain points on the periphery of the baking plates 7, 8, so as to define the spread between the corresponding peripheral elements 20, 18. Preferably, the orifice 24 is specific to steam and has a cross-section which is too narrow for the dough to escape from the appliance.

Preferably, the orifice 24 formed by the spread between the peripheral elements terminates above the median plane 23 of the baking chamber 4 when the two baking sub-assemblies 2, 3 are in their closed proximate position. Due to the fact that the steam always tends to accumulate at the apex of the baking chamber 4, it is preferable for this orifice 24 to terminate at a level closer to the base plane 19 of the upper baking plate 7 than the median plane 23, or even, as illustrated in FIGS. 4 and 5, at the level of this base plane 19. Consequently, the water vapour which tends naturally to accumulate in the top part of the baking chamber 4 (in the case of a waffle iron, in the throats 11 of the upper baking plate 7), easily escapes from the appliance 1 by passing through the exhaust pipe 25. In this way, the dough can occupy the entire volume of the baking chamber 4. This particular feature can produce waffles having a very fine look, its two faces being perfectly formed.

In the embodiment illustrated in FIG. 2, the opening 15 made in the upper baking plate 7 forms the outer delimitation of the orifice specific to steam, while the inner peripheral wall 16 of the lower baking sub-assembly 3 forms its inner delimitation. In the embodiment illustrated in FIG. 3, the outer periphery 20 of the upper baking sub-assembly 2 forms the inner delimitation of the orifice specific to steam, while the outer peripheral wall 18 of the lower baking sub-assembly 3 forms its outer delimitation.

Preferably, the peripheral elements of the two baking sub-assemblies 2, 3 comply such as to delimit an orifice 24 of an exhaust pipe 25 specific to steam, irrespective of the position of the two baking sub-assemblies 2, 3 between their closed proximate position and spread closed position.

Figure 8:
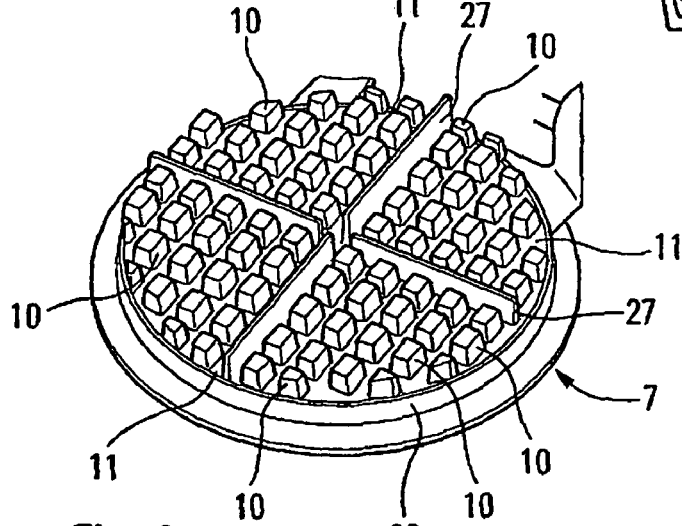
FIG. 8 is a perspective view of a baking plate of the upper baking sub-assembly adapted to a waffle iron according to the third embodiment.

To make evacuation of the steam easier, as is evident from FIGS. 4 to 6, the teeth 10 of the upper baking plate 7 of the waffle iron 1 terminate integrally, in height, in the orifice 24 of the escape pipe 25. As can be seen from FIG. 8, such an upper baking plate 7, adapted to a waffle iron 1 where the orifice 24 is located at the level of the base plane 19 of this plate 7, has no peripheral wall which extends from the base plane 19, in the direction of the lower baking plate.

Figure 9:
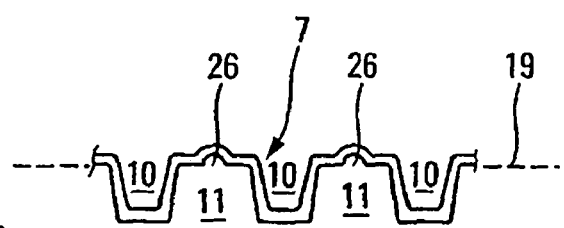
FIG. 9 is a schematic sectional view of the base of a throat of the baking plate of the upper baking sub-assembly according to a variant of the present invention.

Further to this, and still in the interests of facilitating evacuation of the steam, FIG. 9 illustrates a variant in which the upper baking plate 7 comprises steam exhaust ducts 26 which extend along the throats 11, at the base thereof (at the level of the base plane 19). These ducts 26 allow better circulation of the steam. So that these ducts 26 are taken only by steam, their cross-section preferably has the same characteristics as those of the cross-section of the orifice 24 of the exhaust pipe 25 (cross-section less than 2 mm, or even 3 mm, and upper 0.5 mm). Preferably also, these ducts 26 terminate directly in one of these orifices 24.

Furthermore, to facilitate proper filling of the upper baking plate 7 during the baking stage, it is particularly recommended to distribute the dough evenly on the lower baking plate 8. In fact, if a zone of the lower baking plate 8 is barely covered in dough relative to the rest of the plate, the dough situated on this zone is further from the upper baking plate 7 than the rest of the dough. This dough is thus less warm. Due to the expansion of the rest of the dough in contact with the upper baking plate 7 and which pushes this plate 7 up, the portion of dough behind does not succeed in reaching the upper baking plate 7, thus receives less heat, and cannot catch up. Similarly, it is preferable for each baking sub-assembly 2, 3 to comprise a heating device adapted to distribute thermal energy over a majority of the surface of the corresponding baking plate 7, 8. In fact, the more the heat is uniformly distributed, the less there are zones abnormally hot or cold, the more the expansion of the dough is uniform.

In the case of a waffle iron in which the two baking plates 7, 8 are etched so as to bake several waffles at the same time, the baking plates 7, 8 comprise principal grooves 27, 28 distinct from the teeth 10. To improve the homogeneous distribution of the dough on the lower baking plate, the principal grooves 27, 28 can be much thinner than the teeth, their thickness is preferably at most half, or even a third or a quarter of that of a tooth 10.

Figure 10:
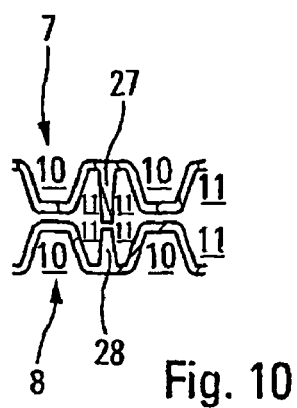
FIG. 10 is a partial sectional view illustrating the cooperation of the two baking plates at the level of the principal grooves delimiting different waffles originating from the same baking, according to a particular embodiment.

In the embodiment illustrated in FIG. 10, the principal grooves 28 of the lower baking plate 8 are lower than the corresponding teeth 10, while the principal grooves 27 of the upper baking plate 7 exceed the median plane 23 when the two baking sub-assemblies 2, 3 are in their closed proximate position.

Preferably, so that the baking dough is not veritably divided by the principal grooves 27, 28, when the two baking sub-assemblies 2, 3 are in their closed proximate position, the upper principal grooves 27 are not in contact with the lower principal grooves 28.

The invention claimed is:

1. A waffle iron comprising an upper baking sub-assembly and a lower baking sub-assembly, both of said baking sub-assemblies each comprising an electrical heating resistance and having a baking plate, each said baking plate having teeth oriented in a direction of teeth on the other baking plate when both upper and lower baking sub-assemblies are in closed proximate position, and throats which delimit said teeth, each upper and lower baking sub-assembly being pivotable with respect to one another between an open position allowing a deposit of a swelling dough to be baked and a removal of a waffle, and said closed proximate position in which they define a baking chamber extending between said teeth and throats and which, when heated, said dough swells and reaches the upper baking plate, the lower baking sub-assembly bearing an outer peripheral wall which extends in a direction of said upper baking sub-assembly when in the closed proximate position and which laterally delimits said baking chamber, said upper baking sub-assembly having an outer peripheral wall which extends in a direction opposite said lower baking sub-assembly, which is disposed in an opening defined by said outer peripheral wall of said lower baking sub-assembly, and which slides inside said outer peripheral wall of said lower baking sub-assembly irrespective of the position of the two baking sub-assemblies between the closed proximate position and a closed spread position in which they are spread from one another due to swelling of the dough which pushes the upper baking sub-assembly upwards, so as to form the baking chamber with a variable volume.

2. The waffle iron as claimed in claim 1, wherein the amplitude of movement of the upper baking sub-assembly between the closed proximate position and the closed spread position is at least equal to 2 mm.

3. The waffle iron as claimed in claim 1, wherein when the two baking sub-assemblies are in their closed proximate position, the spread between the two outer peripheral walls is at most equal to 5 mm.

4. The waffle iron as claimed in claim 3, wherein when the two baking sub-assemblies are in the closed proximate position, the spread between the two outer peripheral walls is at most equal to 3 mm.

5. The waffle iron as claimed in claim 1, wherein each outer peripheral wall describes with a corresponding baking plate supported by said corresponding baking sub-assembly an angle of between 90° and 135°.

6. The waffle iron as claimed in claim 5, wherein said angle is between 92° and 100°.

7. The waffle iron as claimed in claim 1, wherein the baking plate of the lower baking sub-assembly is supported thereby and comprises a prehensile element and is separable from the outer peripheral wall of said lower baking sub-assembly.

8. The waffle iron as claimed in claim 1, wherein each outer peripheral wall is monobloc with a corresponding baking plate.

9. The waffle iron as claimed in claim 1, wherein each outer peripheral wall extends over an entire periphery of the corresponding baking sub-assembly.

10. The waffle iron as claimed in claim 1, wherein when the two baking sub-assemblies are in the closed proximate position, a spread between the two outer peripheral walls forms an exhaust pipe oriented upward from inside the baking chamber to outside for steam generated by baking of the dough.

11. The waffle iron as claimed in claim 10, wherein when the two baking sub-assemblies are in the closed proximate position, the spread between the two outer peripheral walls is at least equal to 0.5 mm.

12. The waffle iron according to claim 2, wherein the amplitude of movement of the upper baking sub-assembly between the closed proximate position and the closed spread position is at least equal to 10 mm.

13. The waffle iron according to claim 12, wherein the amplitude of movement of the upper baking sub-assembly between the closed proximate position and the closed spread position is at least equal to 20 mm.

14. The waffle iron according to claim 4, wherein when the two baking sub-assemblies are in the closed proximate position, the spread between the two outer peripheral walls is at most equal to 2 mm.

15. The waffle iron according to claim 1, wherein an adhesive capacity of an anti-adhesive coating deposited on a baking plate borne by the upper baking sub-assembly is greater than that of an anti-adhesive coating deposited on a baking plate borne by the lower baking sub-assembly.

16. The waffle iron according to claim 1, wherein teeth of the baking plate of the upper baking sub-assembly having a shape which favors gripping the waffle while teeth of a baking plate borne by the lower baking sub-assembly has a shape which favors detachment of the waffle.

17. A waffle iron comprising an upper baking sub-assembly and a lower baking sub-assembly, each said sub-assembly comprising an electrical heating resistance and having a baking plate, each said baking plate having a base plane from which extend teeth oriented in a direction toward the other baking plate when both upper and lower baking sub-assemblies are in a closed proximate position, and throats which delimit said teeth, each said upper and lower baking sub-assembly being pivotable with respect to one another between an open position allowing the deposit of a swelling dough to be baked and the removal of a waffle, and said closed proximate position in which they define a baking chamber in which, when heated, said dough swells and reaches the upper baking plate, the lower baking sub-assembly bearing an outer peripheral wall which extends in the direction of said upper baking sub-assembly when in closed proximate position and which laterally delimits said baking chamber, said upper baking sub-assembly having an outer peripheral wall which extends in the direction opposite said lower baking sub-assembly, which is disposed in an opening defined by said outer peripheral wall of said lower baking sub-assembly, and which slides inside said outer peripheral wall of said lower baking sub-assembly irrespective of the position of the two baking sub-assemblies between the closed proximate position and a closed spread position in which they are spread from one another due to swelling of the dough, so as to form the baking chamber with a variable volume, the outer peripheral wall of said lower baking sub-assembly extending upward beyond said base plane of the teeth of the upper baking plate when the two baking sub-assemblies are in the closed spread position.

18. A waffle iron comprising an upper baking sub-assembly and a lower baking sub-assembly, both baking sub-assemblies being pivotable with respect to one another between an open position allowing the deposit of a swelling dough to be baked and the removal of a waffle, and a said closed proximate position in which they define a baking chamber in which, when heated, said dough swells and reaches the upper baking plate, the lower baking sub-assembly bearing an outer peripheral wall which extends in the direction of said upper baking sub-assembly when in closed proximate position and which laterally delimits said backing chamber, said upper baking sub-assembly having an outer peripheral wall which extends in the direction opposite said lower baking sub-assembly, which is disposed in an opening defined by said outer peripheral wall of said lower baking sub-assembly, and which slides inside said outer peripheral wall of said lower baking sub-assembly irrespective of the position of the two baking sub-assemblies between the closed proximate position and a closed spread position in which they are spread from one another due to swelling of the dough, so as to form the baking chamber with a variable volume, a pipe oriented upward from inside the backing chamber to outside for exhausting steam generated by baking of the dough being defined by a spread between the two outer peripheral walls, when the two baking sub-assemblies are in the closed proximate position.

* * * * *